A. D. RUSNAK.
POTATO DIGGER.
APPLICATION FILED MAY 17, 1910.

1,017,918.

Patented Feb. 20, 1912.

2 SHEETS—SHEET 1.

Witnesses

Inventor
Andrew D. Rusnak,
By Joshua R. H. Potts,
Attorney

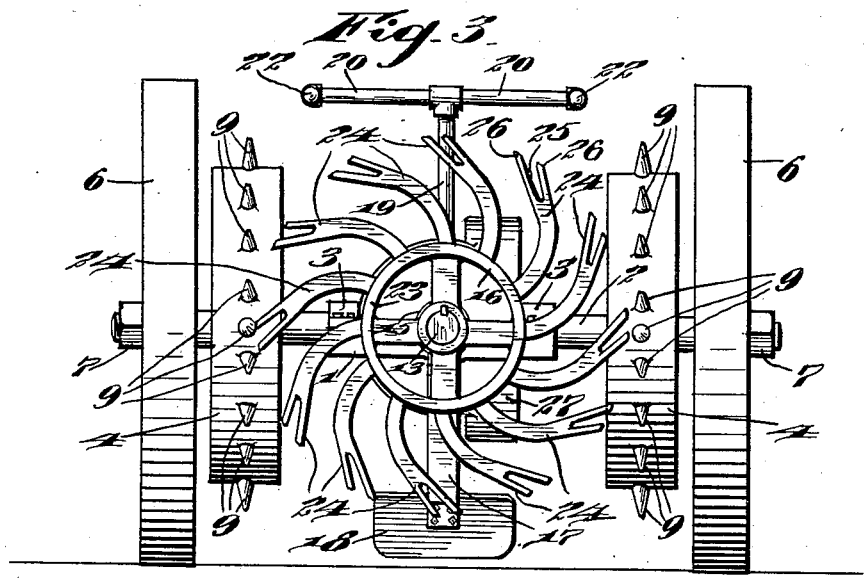

UNITED STATES PATENT OFFICE.

ANDREW D. RUSNAK, OF PHILADELPHIA, PENNSYLVANIA.

POTATO-DIGGER.

1,017,918.  Specification of Letters Patent.  Patented Feb. 20, 1912.

Application filed May 17, 1910. Serial No. 561,835.

*To all whom it may concern:*

Be it known that I, ANDREW D. RUSNAK, a citizen of the United States, residing at Philadelphia, in the county of Philadelphia and State of Pennsylvania, have invented certain new and useful Improvements in Potato-Diggers, of which the following is a specification.

My invention relates to improvements in potato diggers, the object of the invention being to provide a wheeled device adapted to be drawn over the ground by draft animals, and which is constructed to dig the potatoes out of the ground and is provided with improved mechanism for breaking up the dirt and throwing the potatoes out to one side.

A further object is to provide an improved rotary agitator which will be revolved by the turning of the traction wheels on the device, and which is provided with a plurality of split or forked arms adapted to engage the earth turned up by the plow in advance thereof, and throw the potatoes out to one side.

A further object is to provide an improved device of this character which is extremely simple in construction, which is capable of being moved from place to place without operating, which is provided with means for cutting down the potato vines and grass which might entangle the agitator, which may be manufactured and sold at a comparatively low price, and which will be strong and durable in use.

With these and other objects in view, the invention consists in certain novel features of construction and combinations and arrangements of parts as will be more fully hereinafter described and pointed out in the claim.

Figure 1:
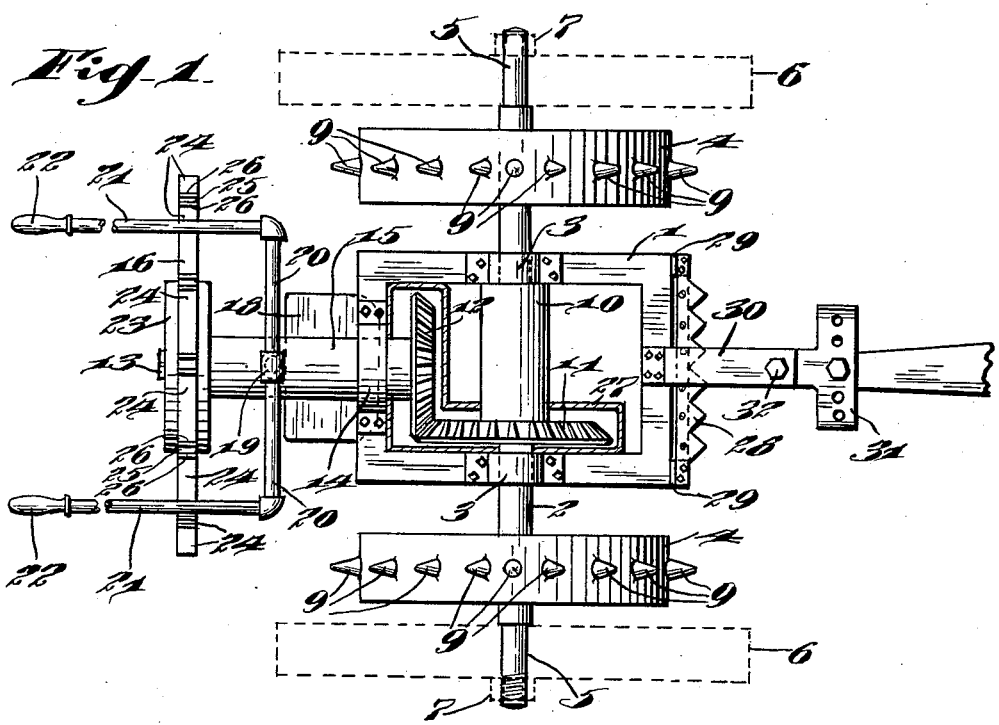
Figure 2:
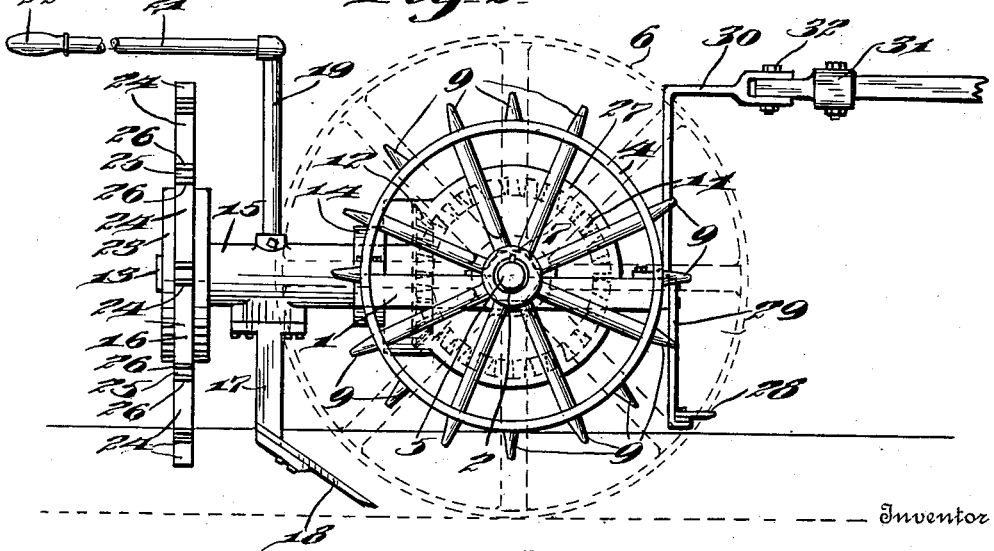

In the accompanying drawings: Figure 1, is a plan view illustrating my improvements, showing in dotted line the larger wheels 6 which support the device when it is being moved from place to place. Fig. 2, is a view in side elevation of Fig. 1. Fig. 3, is a rear end elevation showing the device ready to be transported from place to place. Fig. 4, is a fragmentary view in transverse section through the axle 2. Fig. 5, is a similar view in longitudinal section through the shaft 13.

1, represents a rectangular frame which is supported upon an axle 2, the latter mounted to turn in suitable bearings 3 on the frame 1. On this axle 2, toothed traction wheels 4 are secured and are adapted to support the device when in operation and turn the axle 2 to transmit motion to the operating mechanism, as will hereinafter appear. Axle 2 at its ends, extends out beyond traction wheels 4 and provides journals 5, on which wheels 6 are adapted to be secured by nuts 7 when the device is to be moved from place to place. It will be noted that the wheels 6 are of greater diameter than the greatest diameter of traction wheels 4, so that they serve to support the wheels 4 elevated, and prevent contact of the teeth 9 thereof with the ground, while the device is being moved from place to place. When the device reaches the field and begins its operation, the wheels 6 are removed and the traction wheels 4 run on the ground. The axle 2 between the side members of frame 1, is preferably inclosed in a tubular sleeve or casing 10, and a beveled gear 11 is secured on axle 2, and meshes with a beveled gear 12 on a longitudinal shaft 13. This shaft is mounted in a bearing 14 on frame 1, and projects through a sleeve 15 fixed to frame 1, and on its rear end my improved agitator 16 is secured and turned thereby. A downwardly projecting arm 17 is secured to the tube 15, and supports a cutter or plow 18 at an angle, as illustrated, to cut under the potatoes in the ground. A post 19 is secured to the tube 15 and has laterally projecting rods 20 at its upper end to which rearwardly projecting bars 21 are fixed and provided with handles 22 at their rear end, which enable the operator walking on the ground behind the machine to guide it.

My improved agitator above referred to consists of a central wheel 23 fixed to shaft 13 and provided with an annular series of curved arms 24, the free ends of said arms being split as shown at 25 forming fingers 26, which serve to engage the soil turned up by the plow 18, break the soil into small particles and throw the potatoes out to one side. The gears 11 and 12 are preferably inclosed in a suitable casing 27 to protect them from the dirt, and a toothed cutter 28 is fixed to a depending frame 29 on the front end of frame 1, and is located adjacent the ground level to cut the plants which might entangle the agitator.

An upwardly and forwardly projecting bar 30 is secured to frame 1, is bifurcated at its end as shown and a T-shaped clevis 31 is pivotally secured in the bifurcated end of the bar 30 by means of a bolt 32. This clevis enables the tongue and double trees (not shown) to be connected at the desired point to give the proper draft on the machine.

In operation, traction wheels 4 run on the ground and turn axle 2, which, through the medium of gears 11 and 12 transmit motion to the shaft 13, and the latter rapidly revolves the agitator 16. As the device moves forward over the ground, the plow 18 cuts under the potatoes and the soil with the potatoes therein passes up over the plow into the path of movement of the arms on the agitator which serve to break up the soil and throw the potatoes out to one side.

When the device is to be transported from place to place, the wheels 6 are positioned on the axle 2, and they hold the several operating parts of the device elevated out of contact with the ground.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

In a potato digger, the combination with a frame, an axle supporting the frame, and traction wheels supporting the axle and secured to turn therewith, of a rearwardly projecting shaft supported on the frame, beveled gears connecting the axle and shaft, a plow supported by the frame, and a rotary agitator secured on said shaft and comprising a transversely disposed ring, a single circular series of laterally curved arms having transversely split ends, and said agitator turned in a direction to present the split ends endwise to the soil, substantially as described.

In testimony whereof I have signed my name to this specification in the presence of two subscribing witnesses.

ANDREW D. RUSNAK.

Witnesses:
R. H. KRENKEL,
C. E. POTTS.

---

Copies of this patent may be obtained for five cents each, by addressing the "Commissioner of Patents, Washington, D. C."